(12) United States Patent
Roberts

(10) Patent No.: US 7,061,742 B1
(45) Date of Patent: Jun. 13, 2006

(54) DESK-TOP CONTINUOUS-USE MAGNETIC MEDIA ERASER/DEGAUSSER

(76) Inventor: Melvin D. Roberts, 16591 Arbor Dr., Athens, AL (US) 35613

( * ) Notice: Subject to any disclaimer, the term of this patent is extended or adjusted under 35 U.S.C. 154(b) by 0 days.

(21) Appl. No.: 10/905,396

(22) Filed: Dec. 30, 2004

(51) Int. Cl.
*H01H 47/00* (2006.01)
(52) U.S. Cl. ............................... 361/151; 361/267
(58) Field of Classification Search ............. 361/149, 361/151, 267
See application file for complete search history.

(56) References Cited

U.S. PATENT DOCUMENTS 5,132,860 A * 7/1992 Von Stein ............ 360/118

\* cited by examiner

*Primary Examiner*—Stephen W. Jackson

(57) ABSTRACT

A manually operated continuous-use desk-top magnetic media eraser/degausser that utilizes elaborately shielded state-of-the-art Rare Earth Magnets to uniformly remove magnetically recorded information from audio and video tapes, PC diskettes, and many other types of magnetic media that can be accommodated by the component's 1.0625 inches high by 4.125 inches wide media transport pathway. The media, as it traverses the pathway, passes through a very strong magnetic field created by two powerful grade N40 (40 MGOe) patented neodymium (NdFeB) permanent magnets placed perpendicular and end-to-end under the center of said pathway. As the recorded media is manually manipulated through the pathway, over the magnets, and out the exit, magnetic information stored on said media is removed by the strong magnetic lines of force present within the protective triple-shielded top, bottom, and side components surrounding the transport pathway.

6 Claims, 6 Drawing Sheets

DESK-TOP CONTINUOUS-USE MAGNETIC MEDIA ERASER/DEGAUSSER

BACKGROUND OF THE INVENTION

1. Field of Invention

This invention relates to a continuous-use magnetic media eraser/degausser, which utilizes elaborately shielded state-of-the-art Rare Earth Magnets (NdFeB) to uniformly remove magnetically recorded information. The media can be VHS video tapes, 8 mm camcorder tapes, audio tapes, floppy disks, Zip disks, or most any other video, audio, or digital media small enough to traverse the 1.0625 inches high by 4.125 inches wide tape transport pathway which passes over the powerful neodymium permanent magnets.

2. Description of the Related Art

In previous years, hundreds of millions of magnetic media items have been sold to individuals and businesses for recording video, audio, or data. There likely will become a time when many of these individual users will want to dispose of some or all of such video and audio recordings to ensure that any unwanted recorded matter does not get into the wrong hands. Likewise, many millions of floppy disks and Zip disks, which contain data no longer needed, pose a similar problem. Both problems can be solved with an appropriate magnetic media degausser if such a degausser is both economical and practical for normal household or office use.

New procedures are being developed relating to the requirements associated with the use of surveillance video recordings, which may be submitted as evidence in a court proceeding. The requirement in general states that before a video tape can be submitted as evidence, it must be proven that it was completely erased before it was reused. To support this requirement, all such used surveillance tapes having data no longer required should be degaussed, annotated as such, and then returned to the surveillance tape library for reuse.

The current market offers a broad range of electrically operated magnetic media degaussers, ranging from the lesser expensive five-pound hand-held models at less than $100 to the most expensive floor models weighing hundreds of pounds and costing over $14,000. The market provides access to many expensive electrically powered degaussers, but it appears that the production and use of currently more practical and significantly less costly permanent-magnet degaussers, containing powerful neodymium (NdFeB) magnets, is not consistent with the capabilities offered by the new emerging rare earth magnet technology.

Effective and efficient use of the Rare Earth Magnet technology would avoid one major disadvantage of electrically powered degaussers, which is the excessive heat build-up from high current requirements. This power requirement not only adds to operation expenses, but the heat build-up, if not properly controlled, can disrupt and limit operations due to periodic shutoff to allow for component cooling.

BRIEF SUMMARY OF THE INVENTION

This invention relates to the rapid removal of magnetically recorded images and information from tapes and disks when traversed through a pathway over powerful neodymium permanent magnets, which are centered perpendicular and adjacent to such pathway.

The invention has no switches, controls, adjustments, or moving parts and requires no power source other than the manual effort required to easily manipulate the media to be degaussed through a tape transport pathway. Such a simple fixed configuration eliminates the requirement for operator skills relating either to component adjustments or to special manipulation, handling, and processing for various types of media.

Each time magnetic media is passed through the media transport pathway, it is exposed to the same uniform type and level of magnetic flux—thus ensuring that every pass of the same media type will be affected uniformly. A second pass, with the media rotated 180 degrees, may be required for wider media such as VHS tapes or for higher coercivity media.

Unlike currently marketed hand held degaussers, which are never uniformly effective due to their inherent requirements relating to specific component movements, media proximity, and media exposure durations, the present invention does not have any of these disadvantages. The construction of the present invention is such that all media moves across the magnets in a uniform fixed direction, guided by the walls of the transport pathway. Media proximity is always immediately adjacent to the magnets, since the bottom of the media pathway is at the same height as the top of the permanent magnets. Previous art exposure duration and slow exposure removal is also not a concern in the present invention, since the recorded magnetic media is degaussed uniformly as it passes, at any speed, through the media pathway, over the powerful magnets, and through the pathway exit.

The parts and components of the preferred embodiment of the invention are permanently assembled (glued and stapled) in such a way as to prevent easy access and removal of the strong internal magnets. Although these magnets pose no known health risks, this permanent assembly prevents possible injury to children or other individuals who may not be aware of the physical risks associated with handling such powerful magnets.

BRIEF DESCRIPTION OF THE DRAWING

A general understanding of the manual operation and technical aspects of the degaussing process relating to the present invention will be readily apparent after reviewing the following referenced detailed descriptions and attached drawings:

FIG. 3b represents views of the individual parts included in the magnet protection block shown in FIG. 3a;

DETAILED DESCRIPTION OF THE PRESENTLY PREFERRED EMBODIMENTS

Figure 1:
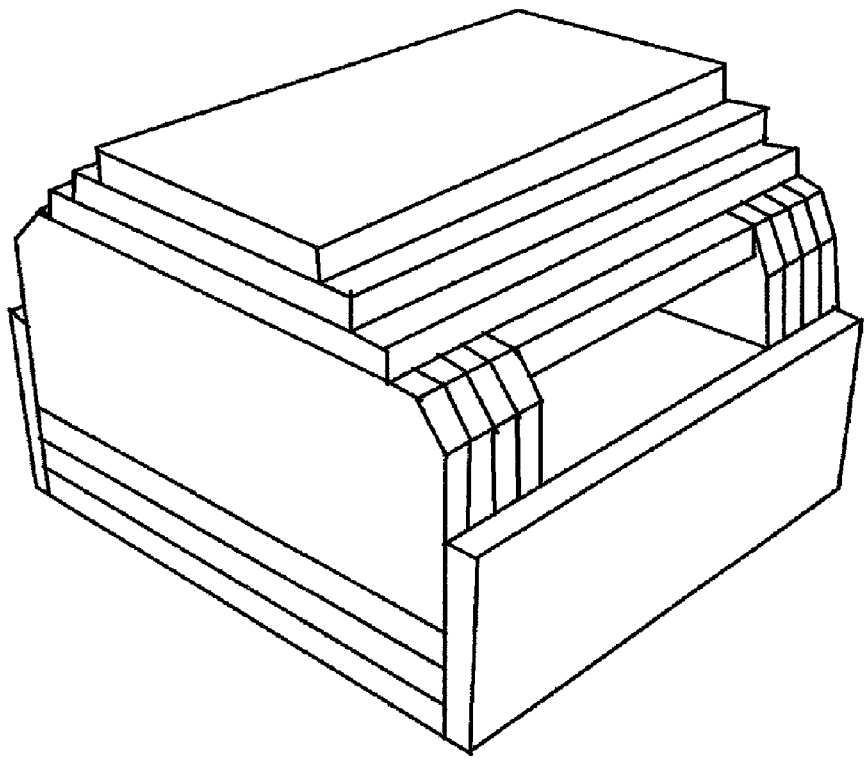
FIG. 1 represents an elevated top/front/side perspective view of the present invention.

The preferred embodiment of the present invention in FIG. 1 provides a convenient and practical method for rapid, effective, and efficient removal of magnetically recorded images and information from the most popular types of video and audio tapes, PC diskettes, Zip diskettes, and many of the other similarly removable magnetic media. It utilizes powerful, patented, stationary neodymium magnets 4X, instead of an electrical power source, to degauss the media.

Figure 3A:
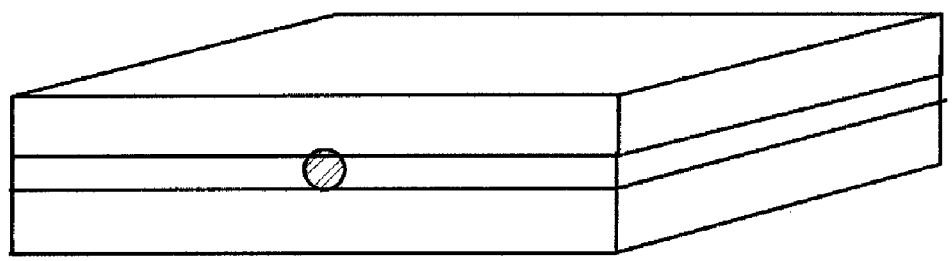
FIG. 3a represents the degausser's magnet protection block, which is inserted and attracted into the middle of the tape transport pathway to prevent unwanted metal objects from inadvertently being drawn into the powerful magnets when the component is not in use.

The present invention, with the exception of the magnet protection block FIG. 3a, is free from any moving or electrical parts that could potentially require replacement or repair—thus rendering the present invention maintenance free during the long, but indefinite, lifespan of the permanent magnets.

Operation of the present invention requires that, first, the previously referenced magnet protection block FIG. 3a be removed from the component FIG. 1 before the degausser is used and reinserted when all degaussing is complete. Degaussing is accomplished by manually manipulating the selected magnetic media candidate (top up) through the invention's tape transport pathway 2R. When such media (if less than 0.75 inches in width) is passed through the pathway and extracted from the opposite end 2L, any previously recorded images or information will normally be completely removed. For wider media (especially VHS tapes), the tape will usually need to be rotated 180 degrees and passed through the pathway 2R a second time to ensure that any data remaining on the previous top side of the media is thoroughly degaussed.

Figure 5A:
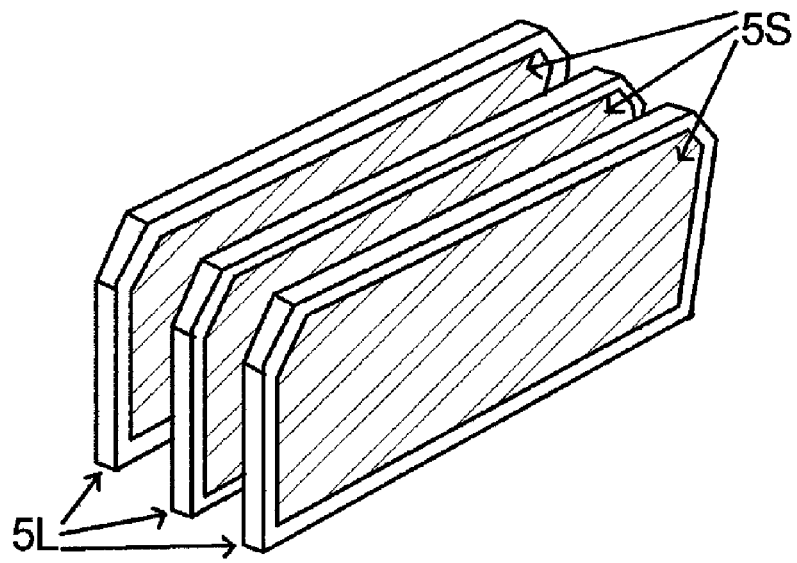
FIGS. 5a and 5b represent the triple-shielded left and right side components, respectively, of the present invention in FIG. 1.
Figure 5B:
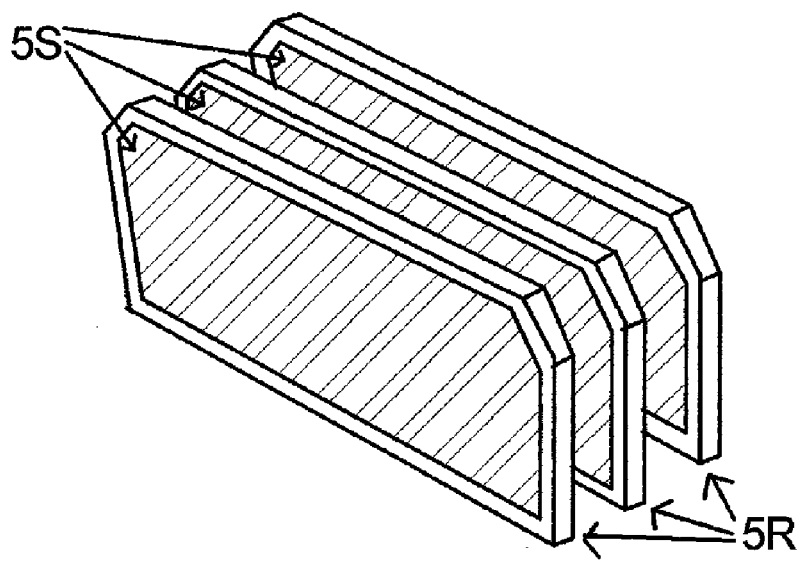
Figure 6:
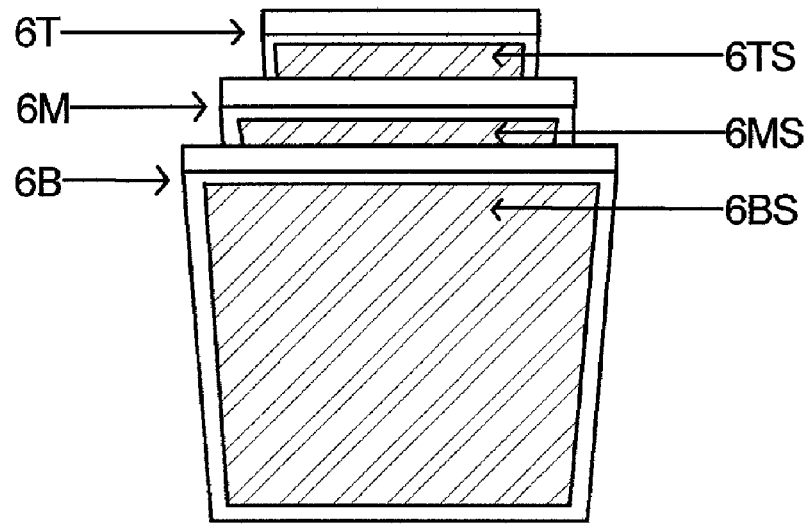
FIG. 6 represents the triple-shielded varied-width top components of the present invention in FIG. 1.
Figure 7:
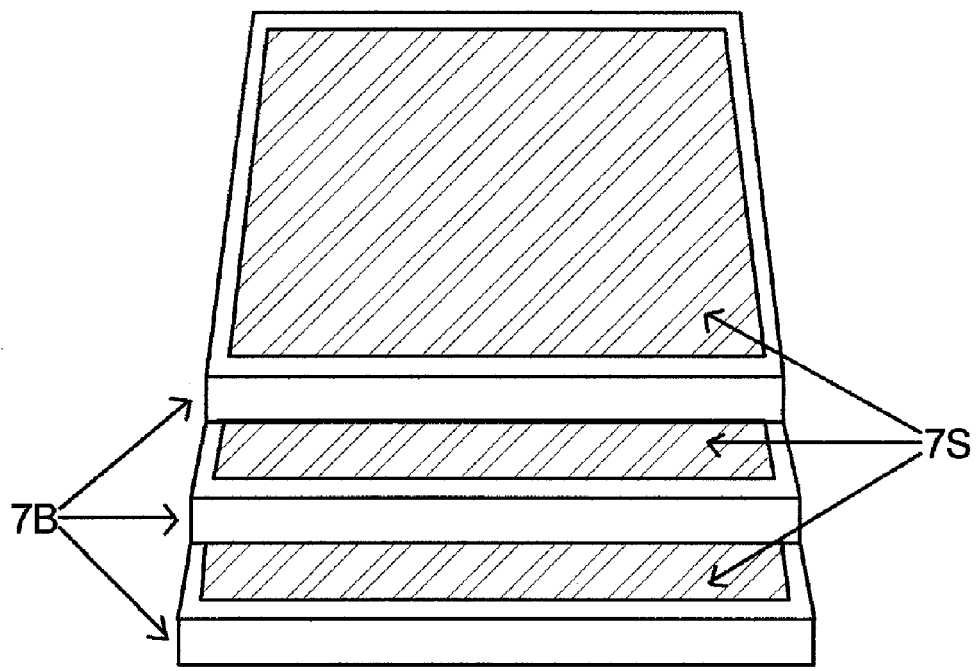
FIG. 7 represents the triple-shielded same-size bottom components of the present invention in FIG. 1.
Figure 8A:
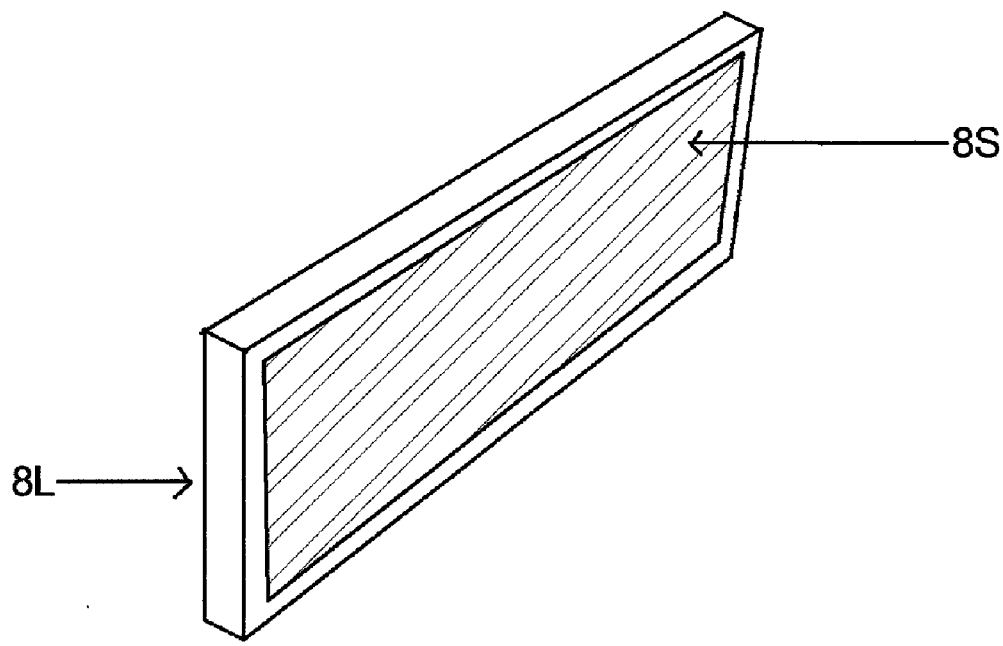
FIGS. 8a and 8b represent the triple-shielded left and right end components, respectively, of the present invention in FIG. 1.
Figure 8B:
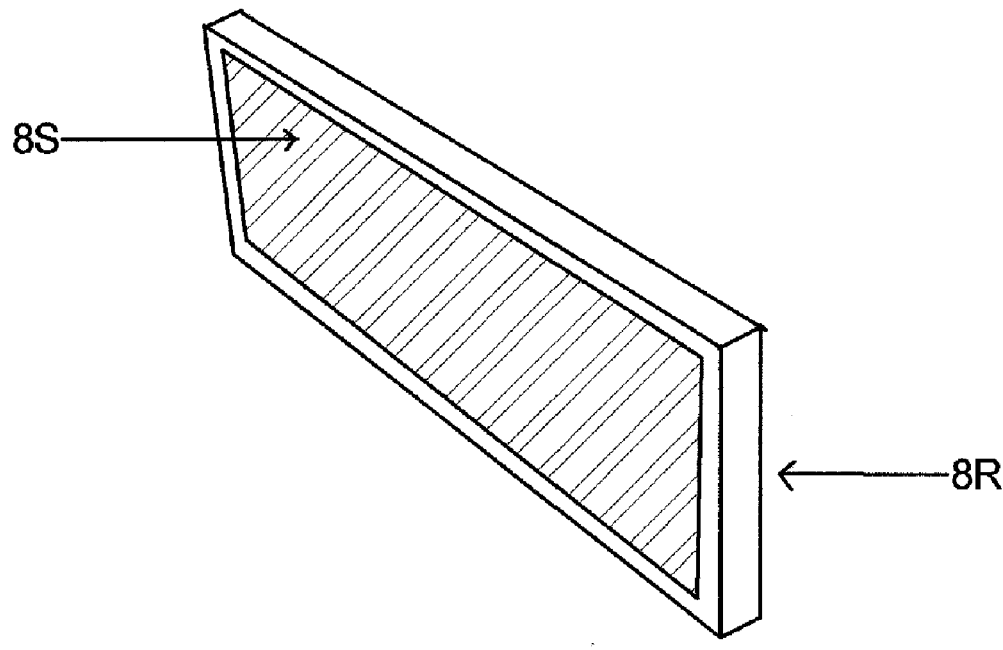

An extremely desirable and important feature of the present invention is the triple-shielded top FIG. 6, sides FIGS. 5a and 5b, bottom FIG. 7, and ends FIGS. 8a and 8b surrounding the media transport pathway and powerful neodymium magnets 4X. The purpose of this shielding is to significantly limit the level of magnetic flux escaping from within said transport pathway, so that any valuable electronic media inadvertently placed in close proximity to or equipment operating adjacent to the invention is not damaged or adversely affected.

The existing shielding will provide adequate protection from accidental media damage due to magnetic flux leakage; if desired, however, a fourth shield 7S of FIG. 7 can be placed at the bottom of the lower panel 7B of FIG. 7 (bottom of FIG. 1) to further minimize leakage. The fourth shield would eliminate the possibility of unacceptable picture interference if the invention FIG. 1 should be placed on top of a Television set.

It is anticipated that any future mass production of the preferred embodiment would require consideration of the use of molded or fabricated non-metallic materials in the FIG. 1 image, with appropriate slots provided for insertion of the magnets 4X and all referenced shielding.

Unlike many currently marketed electro-magnetic degaussers, the present invention can be used continuously for as long as necessary without concern for any heat buildup that might require periodic shutoff to allow for component cooling.

Figure 2:
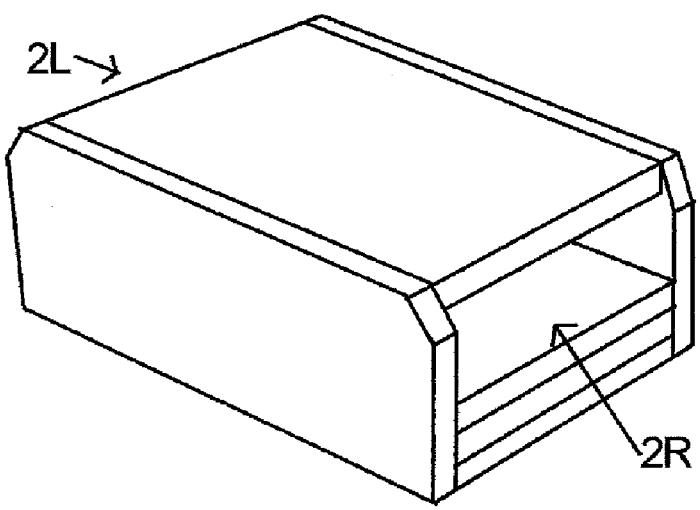
FIG. 2 depicts the actual internal degausser portion of the invention which, with its tape transport pathway 2R, represents the unshielded inner-most component of the multi-shielded invention depicted in FIG. 1.

The least preferred embodiment of the invention in FIG. 1 is the actual degausser component FIG. 2, which is as functionally effective as FIG. 1, although it does not provide adequate shielding of the powerful magnets to prevent possible damage to adjacent magnetic media or electronic equipment.

COMPONENT PARTS AND DIMENSIONS

Figure 3B:
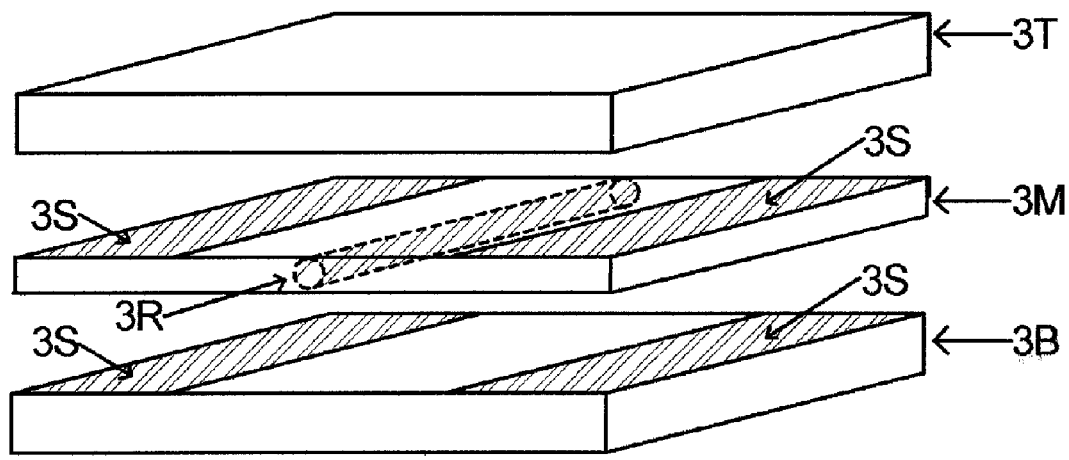
Figure 4A:
FIGS. 4a, 4b, 4c, and 4d represent the top, left side, right side, and multi-part bottom sections, respectively, of the actual degausser portion of the present invention as it is depicted in FIG. 2.
Figure 4B:
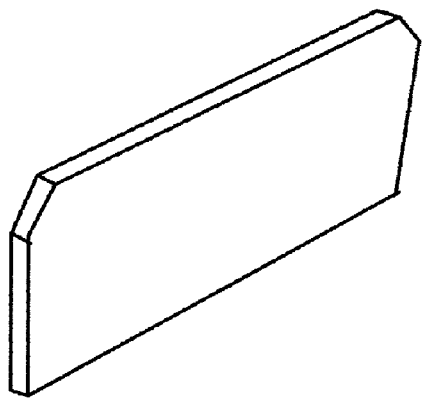
Figure 4C:
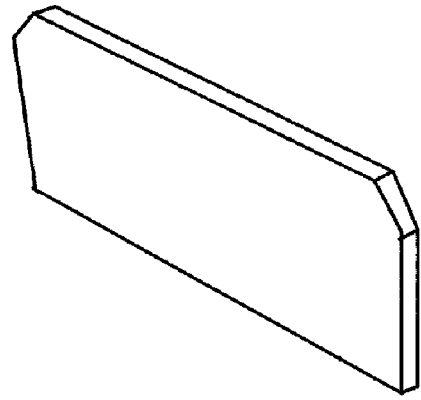
Figure 4D:
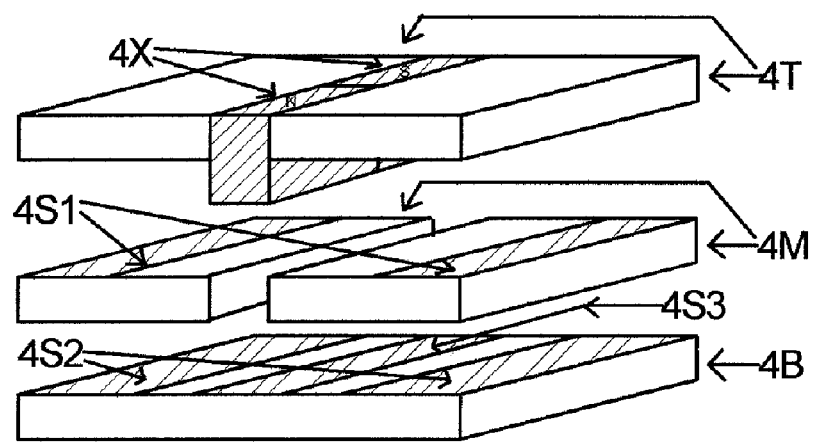

The following dimensions of the invention and its respective components are provided for a better understanding of the actual construction of the preferred embodiment:

FIG. 1, glued and stapled together utilizing 0.375 inches thick Aspen wooden boards and 0.29 inches tin shielding, measures 8.0 inches long, 7.25 inches wide, and 5.0 inches high;

FIG. 2 is 7.25 inches long, 4.875 inches wide, and 2.625 inches high;

References 2R and 2L of FIG. 2 represent the entrance and exit, respectively, of the tape, and other media, transport pathway that is 7.25 inches long, 4.125 inches wide, and 1.0625 inches high;

FIG. 3 is 5.375 inches long, 4.0 inches wide, and 1.0 inches thick;

Parts 3T and 3B of FIG. 3 are 5.375 inches long, 4.0 inches wide, and 0.375 inches thick;

Part 3M of FIG. 3 is 5.375 inches long, 4.0 inches wide, and 0.25 inches thick;

Parts 3S (4) of FIG. 3 are 4.0 inches long, 1.5 inches wide, and 0.29 inches thick, and serve as shields;

Part 3R of FIG. 3 is a steel rod 4.0 inches long and 0.1875 inches in diameter that is centered within the magnetic protection block to allow it, when inserted into the media transport pathway, to be attracted and held in the middle of said pathway by the degaussing magnets 4X—thus protecting the magnets 4X from extraneous metal objects, which might be inadvertently attracted to them when the invention is not in use;

FIG. 4a is 6.5 inches long, 4.125 inches wide, and 0.375 inches thick;

FIGS. 4b and 4c are 7.25 inches long, 2.625 inches high, and 0.375 inches thick, with the upper corners (triangles approximately 0.375 inches by 0.375 inches by 0.5 inches) removed for cosmetic effect;

FIG. 4d (assembled) measures 7.25 inches long, 4.125 inches wide, and 1.25 inches thick;

Parts 4X (2) of FIG. 4d are NdFeB plate magnets, grade N40, Ni plated with Matte finish, magnetized through the thickness, with each measuring 2.0 inches long, 1.0 inches wide, and 0.75 inches thick, and each having a maximum energy product rating of 38–40 MGOe [38–40 million gauss (oersted)];

Parts 4T (2) and 4M (2) of FIG. 4d are 4.125 inches long, 3.0 inches wide, and 0.375 inches thick;

Part 4B of FIG. 4d is 7.25 inches long, 4.125 inches wide, and 0.375 inches thick;

Parts 4S1 (2) of FIG. 4d are 4.125 inches long, 1.5 inches wide, and 0.29 inches thick, and serve as shields;

Parts 4S2 (2) of FIG. 4d are 4.125 inches long, 2.5 inches wide, and 0.29 inches thick, and serve as shields;

Part 4S3 of FIG. 4d is 4.125 inches long, 1.5 inches wide, and 0.29 inches thick, and is mounted at the top center of part 4B of FIG. 4d to serve as a metal attraction base for the magnets 4X;

Parts 5L (3) of FIGS. 5a and 5R (3) of FIG. 5b are 7.25 inches long, 2.625 inches high and 0.375 inches thick, with the upper corners (triangles approximately 0.375 inches by 0.375 inches by 0.5 inches) removed for cosmetic effect;

Parts 5S (6) of FIGS. 5a and 5b are approximately 6.75 inches long, 2.25 inches wide, and 0.29 inches thick, and serve as shields;

Part 6T of FIG. 6 is 7.25 inches long, 3.5 inches wide, and 0.375 inches thick;

Part 6TS of FIG. 6 is 6.75 inches long, 3.0 inches wide, and 0.29 inches thick, and serves as a shield;

Part 6M of FIG. 6 is 7.25 inches long, 4.5 inches wide, and 0.375 inches thick;

Part 6MS of FIG. 6 is 6.75 inches long, 4.0 inches wide, and 0.29 inches thick, and serves as a shield;

Part 6B of FIG. 6 is 7.25 inches long, 5.5 inches wide, and 0.375 inches thick;

Part 6BS of FIG. 6 is 6.75 inches long, 5.0 inches wide, and 0.29 inches thick, and serves as a shield;

Parts 7B (3) of FIG. 7 are 7.25 inches long, 7.25 inches wide, and 0.375 inches thick;

Parts 7S (3) of FIG. 7 are 6.75 inches long, 6.75 inches wide, and 0.29 inches thick, and serve as shields;

Parts 8L of FIGS. 8a and 8R of FIG. 8b are 7.25 inches long, 2.5 inches wide, and 0.375 inches thick;

Parts 8S (2) of FIGS. 8a and 8b are 6.75 inches long, 2.0 inches wide, and 0.29 inches thick, and serve as shields.

What is claimed is:

1. A desk-top continuous-use magnetic media bulk eraser/degausser apparatus, comprising:
    two Rare Earth Magnets permanently placed end-to-end for generating a strong continuous uniform magnetic flux field within an adjacent gap;
    a fixed magnetic media pathway, with separate entrance and exit, passing perpendicular through the gap that is above and adjacent to the magnets; and
    the grade N40 neodymium magnets, combined to measure 1.0 inches wide, 0.75 inches thick, and 4.0 inches long, spanning the width of the media pathway.

2. A degaussing apparatus as defined in claim 1, to include a magnet protection block which is inserted and attracted into the middle of the media pathway to prevent unwanted metal objects from inadvertently being drawn into the magnets when the component is not in use.

3. A degaussing apparatus as defined in claim 1, including means whereby a plurality of metal shields is used to surround the magnets and media pathway in such a manner as to effectively prevent excessive magnetic flux leakage that could cause damage to adjacent magnetic media or electronic equipment.

4. A degaussing apparatus as defined in claim 1, whereby degaussing is accomplished by manually manipulating the selected magnetic media candidate through the media pathway.

5. A degaussing apparatus as defined in claim 1, whereby thin-to-medium magnetic media, such as 8 mm video cassettes, audio cassettes, floppy disks, Zip disks, and some thicker magnetic media will be degaussed during one pass through the media pathway.

6. A degaussing apparatus as defined in claim 1, whereby some thick magnetic media, especially VHS video cassettes, will require one pass through the media pathway to degauss the bottom portion, and then, after being rotated 180 degrees, a second pass through the media pathway to degauss the remaining portion.

\* \* \* \* \*